United States Patent
Iwanaga

(10) Patent No.: US 8,757,747 B2
(45) Date of Patent: Jun. 24, 2014

(54) IMAGE FORMING APPARATUS

(75) Inventor: Tsutomu Iwanaga, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 13/028,126

(22) Filed: Feb. 15, 2011

(65) Prior Publication Data

US 2011/0199408 A1   Aug. 18, 2011

(30) Foreign Application Priority Data

Feb. 17, 2010  (JP) ................................. 2010-032149

(51) Int. Cl.
*B41J 29/38* (2006.01)

(52) U.S. Cl.
USPC .............................................................. 347/9

(58) Field of Classification Search
USPC .................... 358/1.15, 1.4; 713/323; 347/9
See application file for complete search history.

(56) References Cited

U.S. PATENT DOCUMENTS

| 2006/0155890 | A1* | 7/2006 | Wang et al. ........................ 710/8 |
| 2007/0002340 | A1* | 1/2007 | Furukawa ...................... 358/1.4 |
| 2007/0101171 | A1* | 5/2007 | Morisawa ...................... 713/300 |
| 2007/0188659 | A1 | 8/2007 | Matsumoto et al. |
| 2010/0095144 | A1* | 4/2010 | Yamanaka et al. ............ 713/323 |
| 2011/0038006 | A1* | 2/2011 | Sato ............................. 358/1.15 |

FOREIGN PATENT DOCUMENTS

| JP | 2001-100968 A | 4/2001 |
| JP | 2004-345307 A | 12/2004 |
| JP | 2007-215141 A | 8/2007 |

\* cited by examiner

*Primary Examiner* — Manish S Shah
*Assistant Examiner* — Yaovi Ameh
(74) *Attorney, Agent, or Firm* — Kilpatrick Townsend & Stockton LLP

(57) ABSTRACT

When power is turned "ON", power starts to be supplied to a reading unit and a display unit so that images stored in a storage unit can be displayed, and when the images are instructed to be displayed, a viewing system screen is displayed. The power starts to be supplied to an image forming mechanism at a timing when an instruction for switching the viewing system screen to a formation screen, and when an instruction for forming the image being displayed on the formation screen is provided, the image is formed by the image forming mechanism. In this manner, it is possible to prevent wasteful power consumption caused when the power is supplied to the image forming mechanism while the image is displayed on the viewing system screen.

7 Claims, 6 Drawing Sheets

IMAGE FORMING APPARATUS

CROSS REFERENCES TO RELATED APPLICATIONS

The entire disclosure of Japanese Patent Application No. 2010-32149, filed Feb. 17, 2010 is expressly incorporated by reference herein.

BACKGROUND

1. Technical Field

The present invention relates to an image forming apparatus which is connected to a storage unit storing image data and forms an image using image data selected from the stored image data by a user.

2. Related Art

As such a type of image forming apparatus, there is suggested an apparatus in the related art. When image data is not input from a host computer for a predetermined time or longer, or when a power key on an operation panel is pressed by a user, the apparatus stops power supply to a recording head or respective driving motors and switches to an energy-saving control (refer to JP-A-2004-345307, for example).

To perform the energy-saving control is an important task in terms of energy conservation. Incidentally, regarding the image forming apparatus, multifunctional apparatuses including a large display panel and displaying images by slide show as well as having a function of image formation have appeared recently. Since it is not the case that all functions of these apparatuses are used all the time, when these apparatuses are turned on and power is supplied to respective units of these apparatuses so that all functions become usable, the power supply becomes wasteful in some cases, and thus is not preferable in terms of energy conservation.

SUMMARY

An advantage of some aspects of the invention is to provide an image forming apparatus which can achieve energy conservation appropriately according to the usage state of the function of image formation.

The image forming apparatus according to an aspect of the invention adopts the following units to obtain the above advantage.

The image forming apparatus according to an aspect of the invention is connected to a storage unit storing image data and forms an image using image data selected by a user from among the stored image data. The image forming apparatus includes: a display unit displaying images; a reading unit reading the image data from the storage unit; an image forming mechanism forming images by the mechanical operation of the mechanism; a power supply unit supplying power to the display unit, the reading unit, and the image forming mechanism; a main controller controlling the reading unit and the display unit to read the image data from the storage unit and to display the data on a viewing screen when an image display instruction is given, the display unit to display the image being displayed on the formation screen when an instruction for switching the screen from the viewing screen to the formation screen is given, and the image forming mechanism to form the image instructed to be formed when an image forming instruction is provided during the display of the formation screen; and a power supply controller controlling the power supply unit to start the power supply to the reading unit and the display unit when a power providing instruction is provided, and to the image forming mechanism at a predetermined timing when an operation regarding the preparation for image formation is performed before the forming instruction is provided.

In the image forming apparatus according to an aspect of the invention, the power supply unit is controlled to start the power supply to the reading unit and the display unit when the power providing instruction is provided, the reading unit and the display unit are controlled to read the image data from the storage unit and display the data on the viewing screen when the image display instruction is provided, the display unit is controlled to display the image being displayed on the formation screen when the switching instruction from the viewing screen to the formation screen is provided, the power supply unit is controlled to start the power supply to the image forming mechanism at a predetermined timing when the operation regarding the preparation for image formation is performed before the forming instruction is provided, and the image forming mechanism is controlled to form the image instructed to be formed when an image forming instruction is provided during the display of the formation screen. In this manner, it is possible to prevent wasteful power consumption resulting from the power supply to the image forming mechanism during the image display performed on the viewing screen. Furthermore, since power starts to be supplied to the image forming mechanism at a predetermined timing when the operation regarding the preparation for image formation is performed, images can be smoothly formed compared to a case where the power starts to be supplied at the timing when the image forming instruction is provided. As a result, it is possible to achieve energy conservation appropriately according to the usage state of the function of image formation. The viewing screen herein corresponds to a screen displaying images one by one to select the image desired to be edited or the image desired to be formed, and a screen sequentially and consecutively displaying the images stored in the storage unit. The formation screen corresponds to, for example, a preview screen preview-displaying the image being displayed on the viewing screen.

In the image forming apparatus according to an aspect of the invention, the power supply controller may control the power supply unit at the timing when the instruction for switching the screen from the viewing screen to a formation screen is provided, as the predetermined timing. In this way, it is possible to easily determine the timing when the power starts to be supplied to the image forming mechanism.

In the image forming apparatus according to an aspect of the invention, the main controller may control the display unit so that the formation screen can be switched to a non-formation screen including the viewing screen, and the power supply controller may control the power supply unit to stop the power supply to the image forming mechanism when the instruction for switching the screen to the formation screen is not provided over a predetermined time after the screen is switched to the non-formation screen. In this manner, even when the power temporarily starts to be supplied to the image forming mechanism, it is possible to achieve energy conservation appropriately according to the subsequent usage state of the image forming mechanism. In the image forming apparatus according to the aspect of the invention, when the instruction for switching the screen to the non-formation screen is provided while the initialization of the image forming mechanism is performed along with the starting of the power supply to the image forming mechanism, the main controller may control the display unit to switch the screen to the non-formation screen after the initialization is completed. In this manner, it is possible to prevent an unexpected problem that, for example, the mechanism stops in the middle of operation since the initialization of image forming mechanism ends halfway.

In the image forming apparatus according to an aspect of the invention, when a slide show instruction is provided as the image display instruction, the main controller may control the reading unit and the display unit to sequentially read the image data from the storage unit and display the image data on the viewing screen. In the slide show in which a plurality of images is displayed consecutively, it is not necessary to supply power to the image forming mechanism over a relatively long time; therefore, the invention can be applied thereto with great significance.

In the image forming apparatus according to an aspect of the invention, the image forming mechanism may include a discharge head in which a nozzle discharging liquid is formed, and the main controller performs the initialization of the image forming mechanism by discharging liquid from the nozzle as well as the mechanical operation of the mechanism when the power starts to be supplied to the image forming mechanism. In this manner, not only can wasteful power consumption be prevented, but also wasteful liquid consumption can be prevented; therefore further energy conservation can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
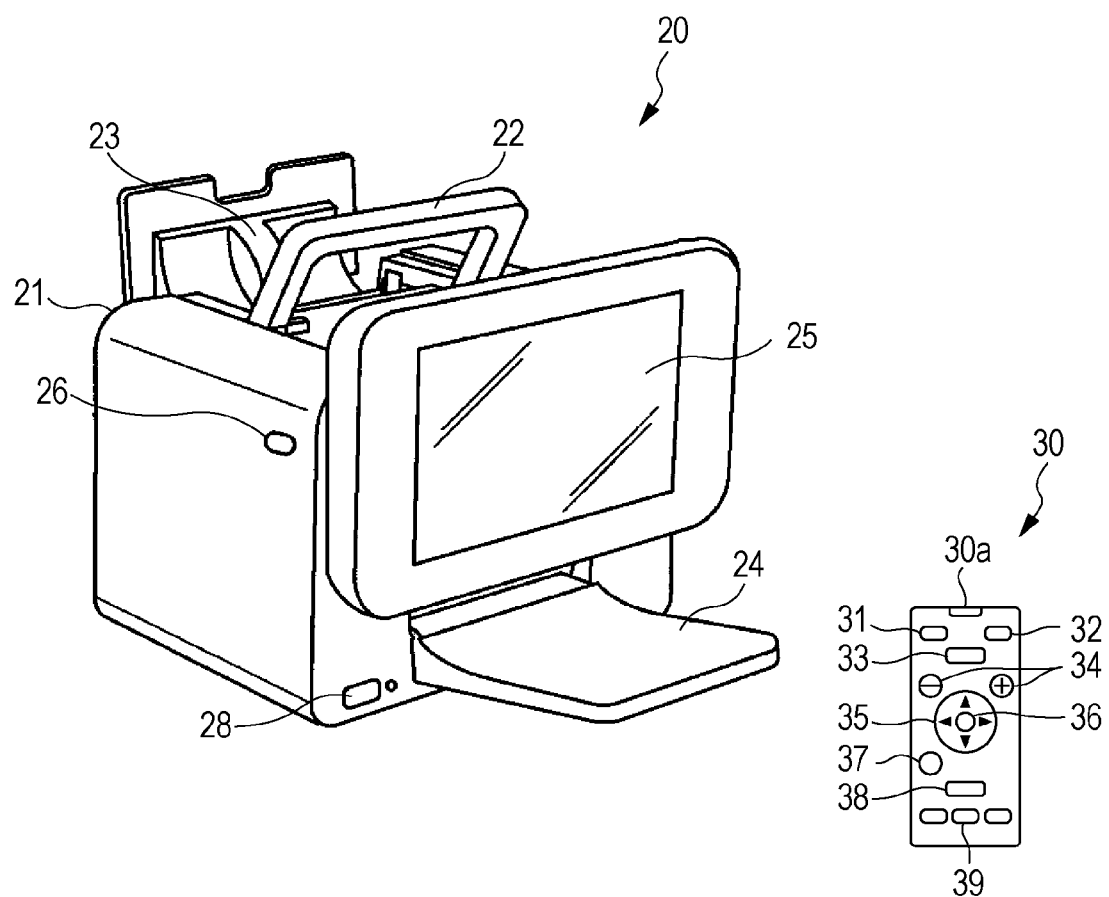
FIG. 1 is an exterior perspective view showing the exterior appearance of a printer.

Next, the embodiment of the invention will be described based on the figures. FIG. 1 is an exterior perspective view showing the exterior appearance of a printer 20 as an embodiment of the invention, and FIG. 2 is a configuration view showing the schematic configuration of the printer 20.

The printer 20 according to the embodiment is configured as an offset printer which includes a built-in printing mechanism 40 (refer to FIG. 2) and performs printing on a sheet S of L print size or a postcard size. As shown in FIG. 1, the printer 20 includes a handle 22 provided on the upper side for carrying a body 21, an auto sheet feeder 23 automatically feeding the sheet S (refer to FIG. 2) set in the rear side of the body 21, a catch tray 24 receiving the sheet S printed by the printing mechanism 40, a liquid crystal display (LCD) 25 which is vertically slidable and used for displaying images or checking the settings during printing, and a power button 26 for turning the main power supply ON/OFF. An infrared communication port 28 (light receiving unit) is provided at the front side of the body 21, and by operating a remote control device 30 by pointing the infrared communication port 28 having a light emitting unit 30a, it is possible to remotely operate the printer 20. The remote control device 30 includes, as buttons for remotely operating the printer 20, a power button 31 for turning power "ON/OFF", a stop/settings clear button 32 which stops printing when pressed during printing and clears the number of copies and the photo selection when pressed on the photo selection screen, a top menu button 33 for displaying the top menu screen, a print number setting button 34 for setting the number of copies, a top-and-bottom and right-and-left button 35 for selecting items and setting values, an OK button 36 for determining items or proceeding to the next screen, a return button 37 for returning to the previous screen, a print button 38 for starting printing, and a setting button 39 displaying the set screen, for example. After the main power supply is turned "ON" by the power button 26, the power of the printer 20 can be turned "ON/OFF" by the power button 31 of the remote control device 30.

Figure 2:
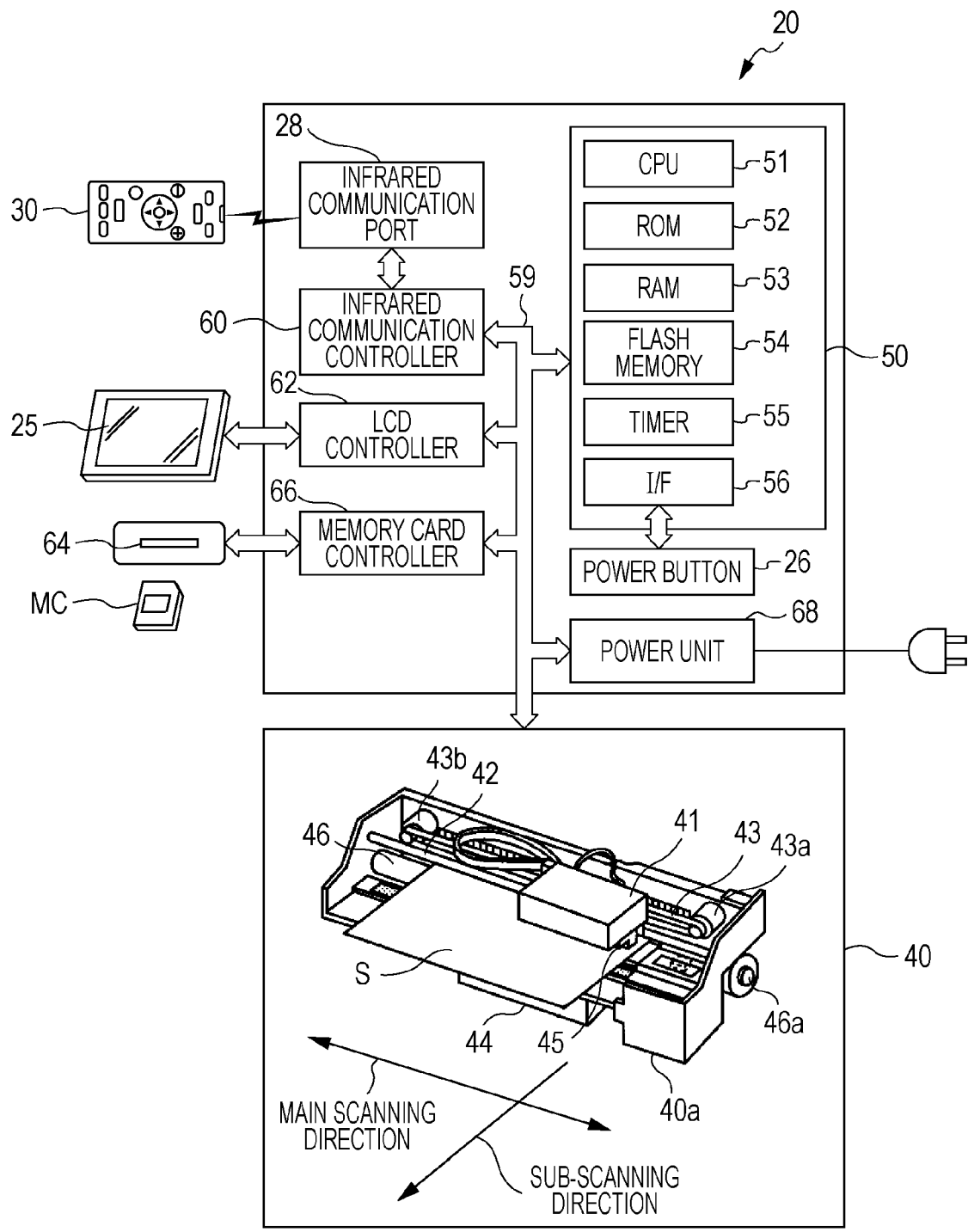
FIG. 2 is a configuration view showing the schematic configuration of printer.

As shown in FIG. 2, the printing mechanism 40 includes a carriage motor 43a disposed at the right side of a mechanism frame 40a in the figure, a driven roller 43b disposed at the left side of the mechanism frame 40a in the figure, a carriage belt 43 hung over the carriage motor 43a and the driven roller 43b in a horizontal direction (main scanning direction) in a loop shape, a carriage 41 which is driven by the carriage belt 43 along with the driving of the carriage motor 43a and horizontally reciprocates along a guide 42, an ink cartridge 44 supplying ink of each color such as cyan, magenta, yellow, or black to a carriage 41, a print head 45 discharging the respective ink supplied from the respective ink cartridge 44 to the sheet S through a nozzle by applying pressure, a transport roller 46 transporting the sheet S in the sub-scanning direction orthogonal to the main scanning direction, and a driving motor 46a driving the transport roller 46. The printing mechanism 40 includes the ink cartridge 44 at its lower side, and is configured as a so-called off-carriage type in which the ink cartridge 44 is not mounted on the carriage 41. The print head 45 herein adopts a method in which the ink is pressurized by transforming a piezoelectric device by applying voltage to the piezoelectric device. However, a method in which the ink is pressurized due to air bubbles generated from the ink heated by applying voltage to a heating resistor (a heater for example) may also be adopted.

As shown in FIG. 2, the printer 20 of the embodiment includes, as a control system, a main controller 50 controlling the entire printer, an infrared communication controller 60 processing the infrared signals input through the infrared communication port 28 as operation signals, an LCD controller 62 controlling the display of an LCD 25, a memory card controller 66 controlling writing and reading of data performed on the a memory card MC inserted in a memory card slot 64, and a power supply unit 68 connected to the external commercial AC source and supplying the input power to the respective units. These controllers are electrically connected to one another through a bus 59. The memory card slot 64 is provided to a side opposite to the side where the power button 26 is provided in FIG. 1. In the following description, the memory card slot 64 and the memory card controller 66 are referred to as a reading unit, and the LCD 25 and the controller 62 are referred to as a display unit, in some cases.

While the memory card MC is inserted in the memory card slot 64, the memory card controller 66 reads out image files stored in the memory card MC and outputs the files to the main controller 50; alternatively, the memory card controller 66 stores the data in the memory card MC according to necessity.

Although detailed description is omitted in the figure, the power supply unit 68 is configured as a circuit having functions of converting the input AC power (AC 100V for example) to DC power (DC 20V for example), performing step-up and step-down of the converted DC power to the necessary voltage, supplying the power after the step-up or step-down to respective units, and shutting off the power supplied to respective units. The power supply unit 68 supplies the power with low voltage such as DC 3V or DC 5V to the main controller 50, the infrared communication controller 60, the reading unit, the display unit, or the like, and supplies the power with high voltage such as DC 24V or DC 42V to the carriage motor 43*a*, the driving motor 46*a*, the print head 45 or the like of the printing mechanism 40.

The main controller 50 is configured as a micro processor having a CPU 51 as its main unit, and includes a ROM 52 storing various process programs, data, and tables, a RAM 53 storing data temporarily, a flash memory 54 which is electrically rewritable and holds data even when power is shut off, a timer 55 measuring time, and an interface (I/F) 56 inputting the operation signal from the power button 26. The main controller 50 inputs, for example, image files from the memory card MC inserted in the memory card slot 64, operation signals from the infrared communication controller 60, or detection signals from a sensor (not shown) of printing mechanism 40. The main controller 50 also stores editing images or the like in the memory card MC, outputs the driving signal to the carriage motor 43*a*, the driving motor 46*a*, and the print head 45 of the printing mechanism 40, the control signal to the LCD controller 62, and a power supply instruction or a power shut-off instruction to the power supply unit 68.

Figure 3:
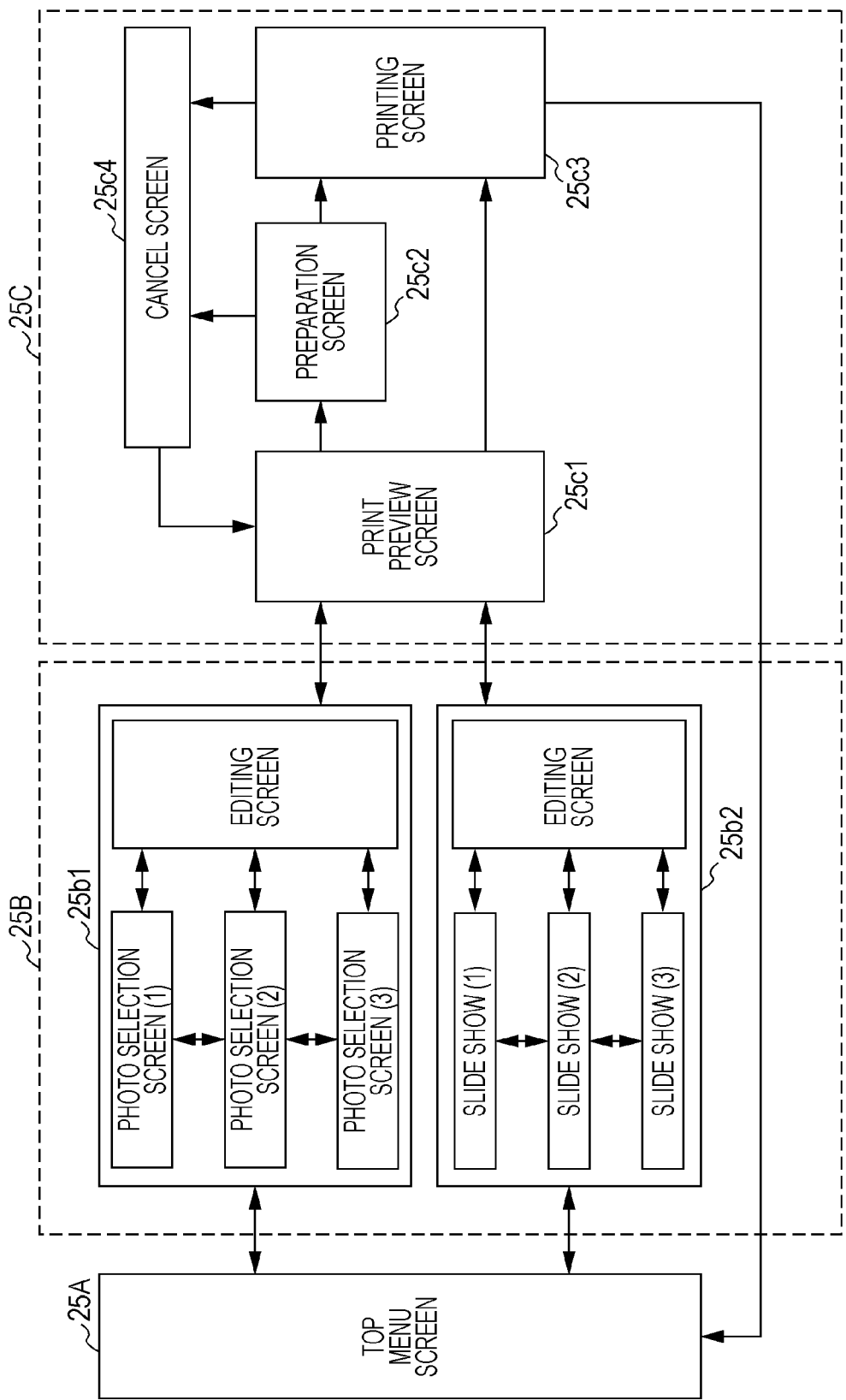
FIG. 3 is an illustrative view showing the type and transition of screens displayed on an LCD.

Now, various screens displayed on the LCD 25 will be described. FIG. 3 is an illustrative view showing the type and transition of screens displayed on the LCD 25. As shown in the figure, the screens displayed on the LCD 25 can mainly be classified into a top menu screen 25A in which various menus can be selected, a viewing system screen 25B displayed during the viewing of an image, and a printing system screen 25C displayed during image printing. In the figure, two-way arrows indicate that the screens can be transited mutually, and a one-way arrow indicates that the screens can only be transited in the direction of the arrow.

The top menu screen 25A is displayed when power is turned "ON" or the top menu button 33 of the remote control device 30 is operated. As the menu that can be selected on the top menu screen 25A, there is "photo selection" option by which a desired image such as an image to be edited or an image to be printed is selected, "slide show" option displaying images in a slide show, and "set" option for setting various items. As screens displayed on the LCD 25, there is a setting screen or the like displayed when "set" option is selected in the top menu screen 25A or the setting button 39 is operated; however, the figure and the description thereof will be omitted since it is not the key point of the invention.

As the viewing system screen 25B, there is a photo selection screen 25*b*1 and a slide show screen 25*b*2. The photo selection screen 25*b*1 is displayed when "photo selection" option is selected on the top menu screen 25A while the memory card MC is inserted in the memory card slot 64, and the images stored in the memory card MC are displayed one by one in the photo selection screen 25*b*1. In the photo selection screen 25*b*1, whenever a user operates the OK button 36 of the remote control device 30, the screen displays the next image (photo selection screen (1), (2), and (3), for example); conversely, when a user operates the return button 37, the screen displays the previous image. When the OK button 36 is operated with placing the cursor on "edit" while the image is displayed, the editing screen in which various types of editing such as color shade editing, brightness editing, and contrast editing are performed on the displayed image is displayed. When the return button 37 is operated on the editing screen, the screen returns to the original screen (photo selection screen (1), (2), and (3), for example). On the other hand, the slide show screen 25*b*2 is displayed when the "slide show" option is selected on the top menu screen 25A while the memory card MC is inserted in the memory card slot 64, and consecutively displays the images (slide show (1), (2), and (3) for example) stored in the memory card MC in, for example, an ascending order of file names at a predetermined interval of time. Similarly to the photo selection screen 25*b*1, the slide show screen 25*b*2 displays the previous image or is switched to the editing screen due to the operation of various buttons of the remote control device 30. When the top menu button 33 or return button 37 is operated in the photo selection screen 25*b*1 or the slide show screen 25*b*2, the screen returns to the top menu screen 25A.

As the printing system screen 25C, there is a print preview screen 25*c*1, a preparation screen 25*c*2, a printing screen 25*c*3, and a cancel screen 25*c*4. The print preview screen 25*c*1 is a screen which appears when the OK button 36 is operated by placing the cursor on "print preview" on the editing screen of the photo selection screen 25*b*1 and the slide show screen 25*b*2, and displays the image which is obtained when the image being displayed on the editing screen is printed. The preparation screen 25*c*2 is a screen displayed when the printing mechanism 40 is not ready for printing, and the detailed description thereof will be made later. The printing screen 25*c*3 is displayed during printing, and the cancel screen 25*c*4 is displayed when stop/settings clear button 32 of the remote control device 30 is operated on the preparation screen 25*c*2 and the printing screen 25*c*3. When the print button 38 is operated during the display of print preview screen 25*c*1, the print process is started, and when the return button 37 is operated, the screen returns to the editing screen of the viewing system screen 25B (the photo selection screen 25*b*1 or the slide show screen 25*b*2).

Figure 4:
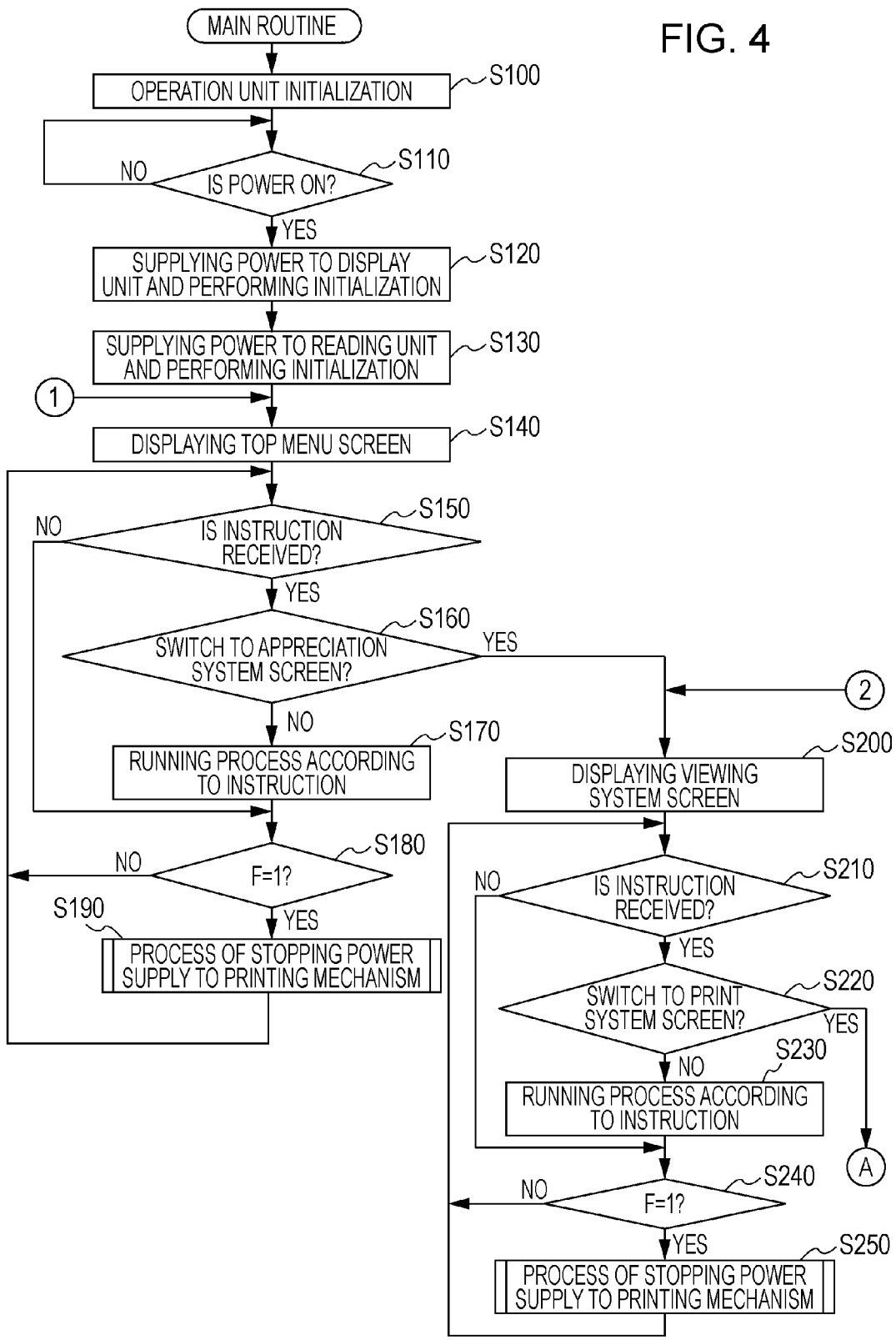
FIG. 4 is a flowchart showing an example (the first half) of the main routine.
Figure 5:
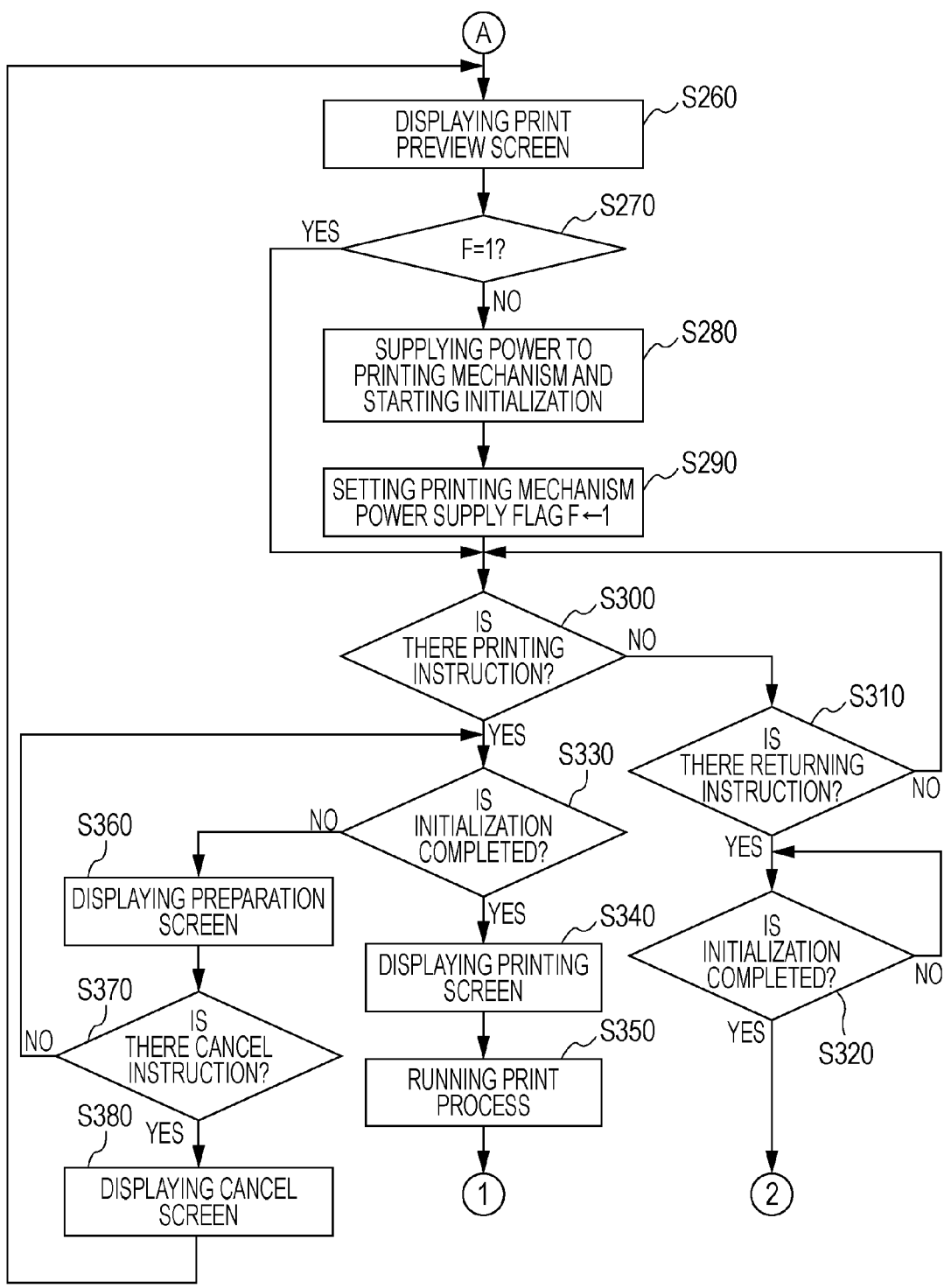
FIG. 5 is a flowchart showing an example (the second half) of the main routine.

The operation of the printer 20 of the configuration according to the embodiment, particularly a series of operations regarding the image display and image printing will be described in relation with the power supply to the respective units. FIGS. 4 and 5 are flowcharts illustrating an example of the main routine. This process is performed by the main controller 50 when the printer 20 (the power supply unit 68) is connected to the commercial AC source and can start its operation accordingly.

When the main routine is performed, the CPU 51 initializes operation units such as the infrared communication port 28, the infrared communication controller 60, and the power button 26 (I/F 56) (step S100), and waits for the user to turn power "ON" (step S110). As described above, the power is turned "ON" when the main power supply is turned "ON" due to the operation of the power button 26, or when the power is turned "ON" is turned "OFF" due to the operation of the power button 31 of the remote control device 30 and then is turned "ON" again. Therefore, the power is determined to be "ON" by detecting these conditions. When it is determined that the power is "ON", the power supply unit 68 is controlled to supply power to the display unit, and the control signal is output to the LCD controller 62 for initialization (step S120); also, the power supply unit 68 is controlled to supply power to the reading unit, and the control signal is output to the memory card controller 66 for initialization (step S130). As the initialization of the display unit and the reading unit, for example, a process of resetting respective set values of a resistor or the like to the initial value is performed to initialize the display unit and the reading unit, whereby the image readout from the memory card MC can be displayed on the LCD 25. At the point of time when the power is determined to be "ON", power is not supplied to the printing mechanism 40.

When the initialization of the display unit and the reading unit is performed in this manner, the top menu screen 25A is displayed on the LCD 25 (step S140), and it is determined whether the operation instruction is received from the user (step S150). When the operation instruction is received, it is determined whether the operation instruction is an instruction for switching the screen to the viewing system screen 25B (step S160). As described above, based on whether one of "photo selection" option and "slide show" option is selected, it is determined whether the operation instruction is an instruction for switching the screen to the viewing system screen 25B. When it is determined that the operation instruction is not an instruction for switching the screen to the viewing system screen 25B in step S160, the process is performed according to the operation instruction received in step S150 (step S170). For instance, when "set" option is selected, respective items which can be set are displayed so that they can be selected, and when the operation is received again after respective items are displayed, the setting values of selected items are changed under the process. When the process is performed according to the operation instruction, or, when it is determined that the operation instruction is not received in step S150, it is determined whether the printing mechanism power supply flag F is a value 1 (step S180). The printing mechanism power supply flag F herein is a flag showing whether power is supplied to the printing mechanism 40 from the power supply unit 68, and a default value thereof is set to a value 0; also, when power is supplied, a value 1 is set through a process described later. Herein, since it is considered that power is not supplied to the printing mechanism 40 after it is determined that power is turned "ON", it is determined that the printing mechanism power supply flag F is not a value 1 in step S180, and the procedure returns to step S150 to repeat the process. When it is determined that the printing mechanism power supply flag F is a value 1, the process of stopping the power supply to the printing mechanism is performed (step S190), and the procedure returns to step S150, but the details of the process of stopping the power supply will be described later.

When it is determined that the operation instruction is an instruction for switching the screen to the viewing system screen 25B in step S160, the viewing system screen 25B is displayed on the LCD 25 (step S200). Also, according to the user's selection, the photo selection screen 25b1 or the slide show screen 25b2 is displayed on the LCD 25. When the viewing system screen 25B is displayed, it is determined whether the operation instruction is received from the user (step S210). When the operation instruction is received, it is determined whether the operation instruction is an instruction for switching the screen to the printing system screen 25C (step S220). Whether the operation instruction is an instruction for switching the screen to the printing system screen 25C is determined based on whether the OK button 36 is operated by placing the cursor on "print preview" in the editing screen of the photo selection screen 25b1 or the slide show screen 25b2, that is, whether the print preview instruction is provided.

When it is determined that the operation instruction is not an instruction for switching the screen to the printing system screen 25C in step S220, the process is performed according to the operation instruction received in step S210 (step S230). Herein, the process of displaying images in order or opening the editing screen is performed, as described above. Though not shown in figure, when the return button 37 is operated, the procedure returns to step S140 to repeat the process. When the process is performed according to the operation instruction in this manner, or, when it is determined that the operation instruction is not received in step S210, it is determined whether the printing mechanism power supply flag F is a value 1 (step S240). Herein, since it is considered that power is not supplied to the printing mechanism 40 as described above, it is determined that the printing mechanism power supply flag F is not a value 1 in step S240 in the similar manner to the step S180, and the procedure returns to step S210 to repeat the process. When it is determined that the printing mechanism power supply flag F is a value 1, the process of stopping the power supply to the printing mechanism is performed in the similar manner to step S190 (step S250), and the procedure returns to step S210.

When it is determined that the operation instruction is an instruction for switching the screen to the printing system screen 25C in step S220, the print preview screen 25c1 is displayed on the LCD 25 (step S260), and it is determined whether the printing mechanism power supply flag F is a value 1 (step S270). Herein, since it is considered that power is not supplied to the printing mechanism 40, it is determined that the printing mechanism power supply flag F is not a value 1 but a value 0 in step S270; therefore, the power supply unit 68 is controlled to supply power to the printing mechanism 40, the printing mechanism 40 is controlled to start the initialization (step S280), and the printing mechanism power supply flag F is set to a value 1 (step S290). As the initialization of the printing mechanism 40, a position seeking process, a measurement process, and a flushing process are performed for example. The position seeking process is a process of checking the position of the print head 45 along the reciprocal movement of the print head 45. The measurement process is a process of checking whether there is an abnormality such as an overload resulting from the load of the carriage motor 43a during the seek position process or from the load of the driving motor 46a during the rotation of transport roller 46. The flushing process is a process of discharging the ink with increased viscosity resulting from dry of the ink which occurs when the print head 45 is not used, by ejecting the ink from the nozzle of the print head 45. As described so far, in the initialization of the printing mechanism 40, the power consumption is large since the respective units are driven, and the ink consumption is large too. Accordingly, for example, in a case where power starts to be supplied not only to the reading unit and the display unit but to the printing mechanism 40 when power is turned "ON", if power is turned "OFF" when only the image is displayed on the viewing system screen 25B without performing printing, the initialization of the printing mechanism 40 becomes useless and power and ink are consumed wastefully. Even though the image is printed, it is not preferable that power is continuously supplied to the printing mechanism 40 which does not need to be driven while the image is displayed on the viewing system screen 25B, in terms of energy conservation. Contrary to this, in this embodiment, when power is turned "ON", power starts to be supplied to the reading unit and the display unit so that the image can be displayed on the LCD 25, and the printing mechanism 40 starts to be supplied with power at the timing when the instruction for switching the screen to the print preview screen 25c1 is provided, that is, at the timing when it is confirmed that the user wants to print the image. Accordingly, it is possible to easily determine the timing for starting the power supply, and to reduce the possibility that the initialization of the printing mechanism 40 becomes useless. For this reason, power starts to be supplied to the printing mechanism 40 not at the timing when power is turned "ON" but at the timing when the print preview instruction is provided.

When the initialization of the printing mechanism 40 is started in this manner, or, when the printing mechanism power supply flag F is determined to be a value 1 in step S270, it is determined whether the user provides a printing instruction (step S300). This process is performed by determining whether the user operates the print button 38. When the user does not provide the printing instruction, it is determined whether the user provides a return instruction by operating the return button 37 (step S310), and when there is no return instruction, the process waits for the printing instruction in step S300. On the other hand, when there is a return instruction, the process waits for the completion of the initialization of the printing mechanism 40 (step S320) and returns to step S200 to display the viewing system screen 25B. In this case, the editing screen before the transition to the print preview screen 25c1 is displayed among the viewing system screen 25B. Herein, since there is a concern that an unexpected problem that, for example, the print head 45 in operation is stopped when the temporarily started initialization of the printing mechanism 40 is stopped halfway, will occur, the process waits for the completion of the initialization of the printing mechanism 40 to display the viewing system screen 25B in order to prevent such a problem.

After it is determined that the printing instruction is provided in step S300, it is determined whether the initialization of the printing mechanism 40 has been completed (step S330). When it is determined that the initialization has already been completed, the printing screen 25c3 is displayed on the LCD 25 (step S340), and the printing process is performed (step S350). In the printing process, the sheet S is transported by rotating the transport roller 46 by the driving motor 46a, the carriage 41 moves reciprocally due to carriage motor 43a, and at the same time, the ink is discharged to the sheet S from the nozzle of the print head 45. Though not shown in the flowchart, printing is performed while it is determined whether the stop/setting clear button 32 of the remote control device 30 is operated for each pulse of the carriage 41, that is, whether there is a cancelling instruction, whenever the carriage 41 passes once. When there is a cancelling instruction, the cancel screen 25c4 is displayed on the LCD 25, the printing process is stopped, and the screen returns to the print preview screen 25c1. When the printing process is performed in this manner, the procedure returns to the step S140, the top menu screen 25A is displayed on the LCD 25, and the process from step S150 is repeated.

When it is determined that the initialization of the printing mechanism 40 has not been completed in step S330, the preparation screen 25c2 is displayed on the LCD 25 (step S360). The preparation screen 25c2 displays messages informing that the initialization of the printing mechanism 40 is being performed and that it is possible to instruct the cancellation of printing. When the preparation screen 25c2 is displayed, while it is determined whether there is a cancelling instruction (step S370), the process waits for the completion of the initialization of the printing mechanism 40 in step S330. When the initialization is completed, the printing screen is displayed in step S340, and the printing process is performed in step S350. In this manner, in a case where the printing mechanism 40 is not completely prepared since the power starts to be supplied to the printing mechanism 40 at the timing when the print preview instruction is provided, this state is relayed to the user by being displayed on the preparation screen 25c2. If power starts to be supplied to the printing mechanism 40 at the timing when the print preview instruction is provided, it is possible to smoothly start printing compared to a case where the power starts to be supplied at the timing when the printing instruction is provided. When it is determined that the cancelling instruction is provided in step S370, the cancel screen 25c4 is displayed on the LCD 25 (step S380), and the process returns to step S260 to display the print preview screen 25c1.

Figure 6:
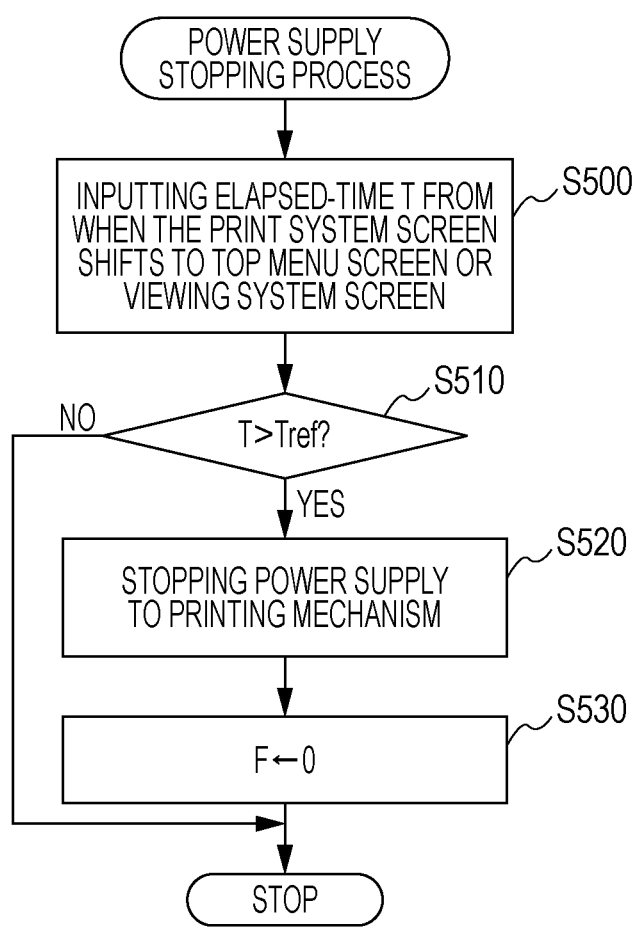
FIG. 6 is a flowchart showing an example of a process of stopping power supply.

Next, the process of stopping the power supply to the printing mechanism performed in the steps S190 and S250 is described. FIG. 6 is a flowchart showing an example of a process of stopping power supply. In the process of stopping power supply, first, the elapsed time T from when the printing system screen 25C transits to the top menu screen 25A or the viewing system screen 25B is input (step S500). The elapsed time T is the time when the timer 55 starts to measure time when the screen is switched to display the top menu screen 25A of step S140 by the printing process performed in the step S350, or when the screen is switched to the viewing system screen 25B of step S200 from the print preview screen 25c1 by the operation of return button 37. For the elapsed time T, to measure time continues while the top menu screen 25A or the viewing system screen 25B is under transition, and when the screen has been switched to the printing system screen 25C (print preview screen 25c1), to measure time stops and the timer is reset. Thereafter, it is determined whether the input elapsed time T exceeds a predetermined time Tref (step S510). The predetermined time Tref herein is set to the time of from several minutes such as five minutes or ten minutes to about several tens of minutes, and stored in the ROM 52 in advance. When it is determined that the elapsed time T does not exceed the predetermined time Tref in step S510, the process ends as it is. On the other hand, when it is determined that the elapsed time T exceeds the time Tref, the power supply unit 68 is controlled to stop power supply to the printing mechanism 40 (step S520), the printing mechanism power supply flag F is reset to a value 0 (step S530), and the process ends. In this manner, when the top menu screen 25A or the viewing system screen 25B is continuously displayed over the predetermined time Tref, it is possible to stop unnecessarily supplying power to the printing mechanism 40 by stopping power supply, even after power temporarily starts to be supplied to the printing mechanism 40. In addition, since the power supply to the printing mechanism 40 is stopped under the condition that the elapsed time T exceeds the predetermined time Tref, it is possible to prevent the starting and stopping of the power supply to the printing mechanism 40 from being repeated frequently. In other words, it is possible to prevent the initialization resulting from the starting of the power supply from being repeatedly performed.

Now the correlation between the components of the embodiment and the components of the invention will be clarified. The memory card MC of the embodiment corresponds to the "storage unit" of the invention, the liquid crystal display (LCD) 25 and the LCD controller 62 correspond to the "display unit", the memory card slot 64 and the memory card controller 66 correspond to the "reading unit", the printing mechanism 40 corresponds to the "image forming mechanism", the power supply unit 68 corresponds to the "power supply unit", the main controller 50 performing the main routine in FIGS. 4 and 5 and the process of stopping the power supply in FIG. 6 corresponds to the "main controller" and the "power supply controller", the viewing system screen 25B corresponds to the "viewing screen", the printing system screen 25C corresponds to the "formation screen", and the top menu screen 25A and the viewing system screen 25B correspond to the "non-formation screen"

According to the printer 20 of the embodiment described above, when power is turned "ON", the power starts to be supplied to the reading unit and the display unit so that the LCD 25 can display images, and the top menu screen 25A is displayed. When the top menu screen 25A is instructed to display images, the viewing system screen 25B is displayed, and the power starts to be supplied to the printing mechanism 40 at the timing when an instruction for switching the viewing system screen 25B to the print preview screen 25c1 is provided. When the print button 38 is operated during the display of the print preview screen 25c1, the images are printed on the sheet S. Therefore, it is possible to prevent wasteful power consumption resulting from the power supply to the printing mechanism 40, which is performed while the viewing system screen 25B displays the images; also, it is possible to smoothly perform printing compared to the case where the power starts to be supplied to the printing mechanism 40 at the timing when the instruction for switching the screen to the print preview screen 25c1 is provided. In addition, since the power starts to be supplied to the printing mechanism 40 at the timing when the instruction for switching the screen to the print preview screen 25c1 is provided, it is possible to easily determine the timing when the power starts to be supplied. Furthermore, when the top menu screen 25A or the viewing system screen 25B is continuously displayed over the predetermined time Tref, it is possible to stop unnecessarily supplying power to the printing mechanism 40 by stopping power supply, even after the power temporarily starts to be supplied to the printing mechanism 40. Also, since the screen transits to the viewing system screen 25B after the completion of the initialization of the printing mechanism 40, it is possible to prevent unexpected problems caused when the temporarily started initialization of the printing mechanism 40 is stopped halfway.

In the embodiment, power starts to be supplied to the printing mechanism 40 when the instruction for switching the screen to the print preview screen 25c1 is received. However, the invention is not limited thereto, and it is also possible to start supplying power to the printing mechanism 40 at the timing when it is determined that the operation regarding print preparation is performed. For example, it is also possible to include a sensor for detecting that the sheet S is set, and to start supplying power to the printing mechanism 40 at the timing when the set of sheet S is detected.

In the embodiment, even in a case where the power has already started to be supplied to the printing mechanism 40, the power supply to the printing mechanism 40 is stopped when the top menu screen 25A or the viewing system screen 25B is displayed over a predetermined time Tref or longer; however, the power supply may also not be stopped. Here, in order to achieve energy conservation, it is preferable to stop the power supply as in the embodiment.

In the embodiment, the predetermined time Tref in the process of stopping the power supply is set to a uniform time; however, the invention is not limited thereto, and the predetermined time Tref of the process of stopping the power supply (step S190) in the display of the top menu screen 25A may be set to be different from the predetermined time Tref of the process of stopping the power supply (step S250) in the display of the viewing system screen 25B.

In the embodiment, the invention is described by being applied to the printer 20 which adopts an ink jet method and uses ink as a colorant; however, the invention is not limited thereto, and may also be applied to a printer which adopts an electrophotographic method and uses toner as a colorant or the like. In addition, the invention may be applied to a printer which includes the function of a scanner and a fax as well as the function of printing and an image display.

In the embodiment, as the viewing system screen 25B, the photo selection screen 25b1 and the slide show screen 25b2 can be displayed; however, the invention is not limited thereto, and only the photo selection screen 25b1 may be displayed as the viewing system screen 25B.

In the embodiment, the invention is described by being applied to the printer 20 including the liquid crystal display 25; however, the invention is not limited thereto, and may also be applied to a plasma display or an organic EL display or the like.

In the embodiment, the image data in the memory card MC connected to the memory card slot 64 is used; however, the invention is not limited thereto. The invention may also include a storage device such as a hard disk drive connected internally and use the image data in the storage device.

The invention is not limited to the embodiment. Needless to say, the invention can be embodied in various manners as long as the embodiments fit the technical scope of the invention.

What is claimed is:

1. An image forming apparatus forming images using image data stored in a storage unit, the apparatus comprising:
 a display unit displaying images;
 a reading unit reading the image data from the storage unit;
 an image forming mechanism forming images by the mechanical operation of the mechanism;
 a power supply unit supplying power to the display unit, the reading unit, and the image forming mechanism;
 a main controller controlling:
 the reading unit and the display unit to read the image data from the storage unit and to display the data on a viewing screen when an image display instruction is provided,
 the display unit to display the image being displayed on a formation screen when an instruction for switching the screen from the viewing screen to a formation screen is provided, and
 the image forming mechanism to form the image instructed to be formed when an image forming instruction is provided during the display of the formation screen; and
 a power supply controller controlling the power supply unit to:
 start the power supply to the reading unit when the image display instruction is received,
 start the power supply to the display unit when the instruction for switching the screen is received,
 start the power supply to the image forming mechanism when the image forming instruction is received, and
 stop the power supply to the image forming mechanism after the image forming instruction is executed, and
 the image forming mechanism at a predetermined timing when an operation regarding the preparation for image formation is performed before the forming instruction is provided, wherein the forming instruction is provided via the display unit displaying the formation screen.

2. The image forming apparatus according to claim 1, wherein the power supply controller controls the power supply unit at a timing when the instruction for switching the screen from the viewing screen to the formation screen is provided, as the predetermined timing.

3. The image forming apparatus according to claim 1, wherein
 the main controller controls the display unit to display a preview screen on which the image being displayed on the viewing screen is preview-displayed as the formation screen.

4. The image forming apparatus according to claim 1, wherein the main controller controls the display unit so that the formation screen can be switched to a non-formation screen including the viewing screen, and the power supply controller controls the power supply unit to stop the power supply to the image forming mechanism when the instruction for switching the screen to the formation screen is not provided over a predetermined time after the screen is switched to the non-formation screen.

5. The image forming apparatus according to claim 4, wherein when instruction for switching the screen to the non-formation screen is provided while the initialization of the image forming mechanism is performed along with the start of the power supply to the image forming mechanism, the main controller controls the display unit to switch the screen to the non-formation screen after the completion of the initialization.

6. The image forming apparatus according to claim 1, wherein when a slide show instruction is provided as the image display instruction, the main controller controls the reading unit and the display unit to sequentially read the image data from the storage unit and to display the data on the viewing screen.

7. The image forming apparatus according to claim 1, wherein the image forming mechanism includes a discharge head in which a nozzle discharging liquid is formed, and the main controller performs the initialization of the image forming mechanism by discharging liquid from the nozzle as well as performing the mechanical operation of the mechanism when the power starts to be supplied to the image forming mechanism.

\* \* \* \* \*